(12) United States Patent
Hampe et al.

(10) Patent No.: US 11,420,825 B2
(45) Date of Patent: Aug. 23, 2022

(54) METHOD FOR MONITORING THE STATE OF A CONVEYOR SYSTEM, AND CONTROL UNIT, MOTORIZED ROLLER, AND CONVEYOR SYSTEM FOR CARRYING OUT THE METHOD

(71) Applicant: INTERROLL HOLDING AG, Sant' Antonino (CH)

(72) Inventors: Andreas Hampe, Sant' Antonino (CH); Herbert Henze, Sant' Antonino (CH)

(73) Assignee: INTERROLL HOLDING AG, Sant' Antonio (CH)

( * ) Notice: Subject to any disclaimer, the term of this patent is extended or adjusted under 35 U.S.C. 154(b) by 176 days.

(21) Appl. No.: 16/770,770

(22) PCT Filed: Dec. 10, 2018

(86) PCT No.: PCT/EP2018/084177
§ 371 (c)(1),
(2) Date: Jun. 8, 2020

(87) PCT Pub. No.: WO2019/115456
PCT Pub. Date: Jun. 20, 2019

(65) Prior Publication Data
US 2020/0299068 A1 Sep. 24, 2020

(30) Foreign Application Priority Data
Dec. 11, 2017 (DE) .................... 10 2017 129 459.7

(51) Int. Cl.
*B65G 43/00* (2006.01)
*B65G 13/02* (2006.01)
(Continued)

(52) U.S. Cl.
CPC ............ *B65G 43/00* (2013.01); *B65G 13/02* (2013.01); *B65G 43/08* (2013.01); *B65G 23/08* (2013.01);
(Continued)

(58) Field of Classification Search
CPC ........ B65G 13/02; B65G 23/08; B65G 43/00; B65G 43/08; B65G 2201/0267;
(Continued)

(56) References Cited

U.S. PATENT DOCUMENTS 5,228,558 A * 7/1993 Hall .......................... H02P 5/50
198/577
6,899,219 B2 * 5/2005 Cotter .................. B65G 47/261
198/781.09
(Continued)

FOREIGN PATENT DOCUMENTS

CN 1787359 6/2006
CN 101102948 1/2008
(Continued)

*Primary Examiner* — Gene O Crawford
*Assistant Examiner* — Keith R Campbell
(74) *Attorney, Agent, or Firm* — Price Heneveld LLP (57) ABSTRACT

A method for state monitoring in a conveyor system, and also to a control unit, to a motorized roller, to a conveyor zone, to a conveyor section and to a conveyor system for carrying out this method. The method comprises checking for the presence of a reference operating state, determining a current of the motorized roller if the reference operating state is present, and comparing the determined current of the motorized roller with a reference value for the reference operating state.

20 Claims, 4 Drawing Sheets

(51) Int. Cl.
*B65G 43/08* (2006.01)
*B65G 23/08* (2006.01)

(52) U.S. Cl.
CPC .............. *B65G 2201/0267* (2013.01); *B65G 2203/0266* (2013.01); *B65G 2203/042* (2013.01); *B65G 2811/0673* (2013.01)

(58) Field of Classification Search
CPC ...... B65G 2203/0266; B65G 2203/042; B65G 2811/0673
See application file for complete search history.

(56) References Cited

U.S. PATENT DOCUMENTS

| | | | | |
|---|---|---|---|---|
| 7,014,038 | B2* | 3/2006 | Leingang | B65G 13/06 198/782 |
| 8,695,786 | B2* | 4/2014 | Breen | B65G 47/261 198/781.05 |
| 8,757,363 | B2* | 6/2014 | Combs | G05B 19/4189 198/781.01 |
| 8,887,897 | B2* | 11/2014 | Itoh | B65G 43/00 198/781.05 |
| 9,862,544 | B2* | 1/2018 | Reichel | B65G 13/075 |
| 11,136,198 | B2* | 10/2021 | Hampe | B65G 43/02 |
| 2009/0294255 | A1 | 12/2009 | Szarkowski et al. | |
| 2012/0048682 | A1 | 3/2012 | Itoh et al. | |

FOREIGN PATENT DOCUMENTS

| | | |
|---|---|---|
| CN | 202594348 | 12/2012 |
| DE | 102006054575 A1 | 5/2008 |
| DE | 202009012822 | 2/2011 |
| DE | 102011053145 | 3/2012 |
| DE | 102015104130 | 9/2016 |
| DE | 102015114030 | 3/2017 |
| DE | 102016120415 | 4/2018 |
| EP | 1021664 | 7/2000 |
| EP | 1620312 | 2/2006 |
| JP | H07194186 | 7/1995 |
| JP | H11304826 | 11/1999 |
| JP | H11326147 | 11/1999 |
| JP | 2013104795 | 5/2013 |

* cited by examiner

METHOD FOR MONITORING THE STATE OF A CONVEYOR SYSTEM, AND CONTROL UNIT, MOTORIZED ROLLER, AND CONVEYOR SYSTEM FOR CARRYING OUT THE METHOD

CROSS-REFERENCE TO FOREIGN PRIORITY APPLICATION

The present application claims the benefit under 35 U.S.C. §§ 119(b), 119(e), 120, and/or 365(c) of PCT/EP2018/084177 filed Dec. 10, 2018, which claims priority to German Application No. 10 2017 129 459.7 filed Dec. 11, 2017.

FIELD OF THE INVENTION

The invention relates to a method for state monitoring in a conveyor system and also to a control unit, to a motorized roller, to a conveyor zone, to a conveyor section and to a conveyor system for carrying out this method.

BACKGROUND OF THE INVENTION

Conveyor systems are used for different purposes in logistic applications. They can thus be used for example in pallet conveyance, for the conveyance of parcels in parcel dispatch centers, for conveying containers in storage areas of different types or for baggage transport in airports and in numerous other applications. Here, a conveyor system regularly comprises one or more conveyor sections which each comprise a plurality of rollers which are arranged next to one another and whose upper circumferential surface respectively serves for receiving conveyable items. It is likewise possible for motorized rollers to be used in conveyor systems having belt conveyors and/or band conveyors in which motorized rollers drive a belt and/or a band, and the belt and/or the band serves for receiving the conveyable items.

In these conveyor sections there can be arranged, on the one hand, nondriven conveyor rollers, which are also referred to as idling rollers or slave rollers which are driveless and are only mounted in a rotatable manner in a conveyor frame. In these conveyor sections there can also be arranged motorized rollers, which are also referred to as driven conveyor rollers and are motor-operated and are set in rotation by means of an electric drive unit. On the one hand, the motorized rollers can serve to transport the conveyable items directly by way of the outer circumferential surface of their roller body. On the other hand, a transmission of the rotation of the motorized roller to one or more idling rollers by means of a transmission element, for example a belt drive, by the motorized roller also makes it possible for one or more idling rollers to be set in rotation such that they can also drive the conveyable items by way of their outer circumferential surfaces.

Conveyor rollers, and, in particular, motorized rollers, are known for example from DE 10 2006 054 575 A1, EP 1 02 1664 B1, DE 20 2009 012 822 U1, DE 10 2015 104 130, DE 10 2015 114 030 or DE 10 2016 120 415 of the applicant.

In addition to general control and regulation requirements, which necessitate certain transmission mechanisms for transmitting the actual state from the conveyor section into a control unit and for transmitting a desired state from the control unit into the motorized roller, one requirement placed on such motorized rollers is the fact that it is desirable to carry out the operation of such a conveyor section with a high degree of reliability. This is based on the fact that the typical intralogistic applications regularly involve conveying requirements in which a failure of the conveyor section entails serious time delays and financial harm going far beyond the pure financial input for replacing the component triggering the disturbance. Moreover, it is frequently the case in conveyor sections that use is made of a multiplicity of such motorized rollers that therefore constitute technically identical systems in large numbers, with it being the case, however, that the very failure of a single motorized roller limits or completely interrupts the functioning of the entire conveyor section. It is, therefore, an important aim to improve the reliability of the operation of such conveyor sections in which motorized rollers are used.

The German Patent and Trade Mark Office has searched the following further prior art in the priority application to the present application: DE 10 2011 053 145 A1.

SUMMARY OF THE INVENTION

It is, therefore, an object of the present invention to provide an improved method for state monitoring in a conveyor system and also an improved control unit, an improved motorized roller, an improved conveyor zone, an improved conveyor section, and an improved conveyor system for carrying out this method. It is, in particular, an object of the present invention to provide a method for state monitoring in a conveyor system and also a control unit, a motorized roller, a conveyor zone, a conveyor section, and a conveyor system for carrying out this method which increase the reliability.

This object is achieved by a method for state monitoring in a conveyor system, for example, in a conveyor section and/or a conveyor zone of a conveyor system, having a motorized roller and a control unit, in particular, a control unit for controlling the motorized roller, the method comprising checking for the presence of a reference operating state, in particular, an operating state of the motorized roller and/or of the conveyor zone and/or of the conveyor section and/or of the conveyor system, determining a current of the motorized roller if the reference operating state is present, and comparing the determined current of the motorized roller with a reference value for the reference operating state.

Conveyor rollers, and, in particular, motorized rollers, are preferably constructed in such a way that the roller body is designed to be hollow at least in certain portions and, in particular, has one hollow end, preferably two hollow ends. In the case of motorized rollers, the drive unit is preferably arranged within an interior of the roller body. If the drive unit is arranged within the roller body, no mechanical components arranged outside the roller body are required to generate the rotation of the roller. A drive unit arranged in the interior of the roller body can, for example, have a coupling unit which is designed and arranged to transmit a torque from the drive unit to an inner circumferential surface of the interior of the roller body. Motorized rollers of this design type are used for different purposes in logistic applications, for example, to be mounted in a frame by means of a drum motor shaft and a drum motor axle. The electric drive unit is typically designed to transmit a conveying torque from the drum motor shaft to the drum tube. This transmission can occur via a drum motor gear mechanism comprised by the motorized roller. By contrast, the drum motor axle serves typically only for mounting the motorized rollers in the frame.

A motorized roller can serve, by means of a belt or the like, to drive other devices, for example, a conveyor section consisting of a plurality of conveyor rollers. Furthermore, the motorized roller can be inserted directly as a conveyor member into a conveyor section and bear the conveyable items and convey them by rotation of the motorized roller. A preferred application consists in using the motorized roller in a conveyor band section as a drive element, preferably as an end-side drive element, and in guiding a conveyor band or belt around the drum body with partial wraparound, and in setting the band or belt in movement by rotation of the drum body.

Motorized rollers are used in intralogistics in a wide variety of applications, for example, for conveying baggage, products, parcels, containers, pallets, or the like in logistics centers, in industrial manufacturing, in mail distribution centers, in baggage handling, and the like. Here, such motorized rollers are regularly used in conveyor sections of relatively large conveyor systems and serve to move the conveyable items. The motorized rollers can be coupled by means of drive belts, chains, and the like to adjacent concomitantly running idling rollers and drive the latter so as thereby to define a uniformly activated conveyor zone. A plurality of such conveyor zones can then be arranged in succession in the conveyor section in order to convey the conveyable items along this conveyor section. Motorized rollers of this type are also referred to as motor-operated conveyor rollers or roller drives or designated in some other way. A motorized roller can also be a drum motor which is used, for example, to drive a conveyor band as an end-side deflection roller, or in some other form drives a conveyor section with conveyor band or an otherwise designed conveyor section.

In principle, it is a requirement of such motorized rollers in use in conveyor sections and conveying applications that they are able to be operated under open-loop control or closed-loop control in order to convey the conveyable items in a certain manner. Thus, for example, accumulation pressure-free conveyance, so-called ZPA=zero pressure accumulation, or conveyance with a small accumulation pressure, so-called LPA=low pressure accumulation, is often desired in which conveyable items situated on the conveyor section do not come into contact with one another or come into contact with one another only with small accumulation pressure, with the result that damage to a conveyable item cannot arise as a result of added-up contact forces. Furthermore, it is known to convey conveyable items on a conveyor section with single discharge or with block discharge, that is to say to operate the conveyance of conveyable items in such a way that in each case one conveyable item is conveyed further and a subsequent conveyable item is conveyed, likewise individually, into the resultant gap, or to convey a plurality of conveyable items simultaneously while maintaining their spacing. For the purpose of this closed-loop control and open-loop control, it is known practice to obtain certain data from the conveyor section, for example, via a light barrier sensor, in order to be able to feed information into a controller via the position of a conveyable item, and furthermore to send control commands to a motorized roller in order to set it in operation or to stop it or in order, for example, to control its rotational speed. What is to be understood here by rotational speed is the number of revolutions per minute, with this rotational speed being based on the revolutions per minute of the motor or the revolutions per minute of the conveyor roller, which can be different from one another if the drive unit comprises a gear mechanism.

The solution according to the invention provides for a state monitoring to be carried out on the basis of the determined current of the motorized roller. This has the advantage that there is no need to record a plurality or multiplicity of different values from which statements on the state can be derived, but preferably the determined current is sufficient for this purpose. In order to make this possible, the current is determined in a certain situation, namely in a reference operating state, and compared with a reference value for this reference operating state.

The invention is based, inter alia, on the finding that certain values and/or profiles of the current, in particular, the input current, of the motorized roller are characteristic for certain operating states. In particular, such characteristic values and/or profiles are used as reference values. Furthermore, the invention is based on the finding that, by comparing the determined current of the motorized roller with a reference value for a certain reference operating state, conclusions on the state of the motorized roller are possible. It has additionally been recognized that this comparison also makes it possible to draw conclusions on further elements of a conveyor zone and the states thereof. In this way, a particularly simple and efficient and at the same time reliable possibility of state monitoring in a conveyor system can be provided by determining the current of the motorized roller in a certain reference operating state.

The control unit is preferably designed to carry out one, two, three, or more or all of these and possibly further steps of the method.

What can be understood as reference value in the present description is preferably a single value and/or a range of values and/or a value profile, in particular, over a certain time period, and/or a variable (for example, an average value) derived from a plurality of individual variables.

According to a preferred embodiment, the method comprises checking whether the determined current of the motorized roller deviates from the reference value for the reference operating state. It is also preferred that the method comprises checking whether a deviation of the determined current of the motorized roller from the reference value for the reference operating state exceeds a predetermined value. Furthermore, it is preferred that the method comprises checking whether the determined current of the motorized roller undershoots or exceeds the reference value for the reference operating state by a predetermined value. This is preferably part of the step of comparing the determined current of the motorized roller with the reference value for the reference operating state.

If the determined current of the motorized roller exceeds the reference value for the reference operating state by a predetermined value, this can be an indication of a certain fault state, such as, for example, a blockage of the motorized roller and/or of a bearing and/or of other elements of a conveyor zone. If the determined current of the motorized roller undershoots the reference value for the reference operating state by a predetermined value, this can be an indication of a certain fault state, such as, for example, the failure of a slave roller and/or gear mechanism damage and/or a defective transmission element.

According to a further preferred embodiment, the method comprises generating a deviation signal if the determined current of the motorized roller deviates from the reference value for the reference operating state, in particular, if the deviation exceeds or undershoots a predetermined value. In a further preferred embodiment, the method comprises deriving a fault state, preferably a fault state of the motorized roller and/or of the conveyor zone and/or of the conveyor section and/or of the conveyor system, on the basis of the comparison of the determined current of the motorized roller with the reference value for the reference operating state. The generation of a deviation signal and/or the deriving of a fault state advantageously allow/allows measures to be initiated before, for example, an undesired further or other state occurs. Measures can be, for example, that a co-worker is notified and/or the control of the motorized roller and/or of the conveyor zone and/or of the conveyor section and/or of the conveyor system is changed, for example, to stop the operation of the motorized roller and/or of the conveyor zone and/or of the conveyor section and/or of the conveyor system or to transfer it into another operating state.

It is also preferred that the deriving of a fault state occurs in dependence on a deviation of the determined current of the motorized roller from the reference value for the reference operating state. As described above, an upward deviation can be an indication of certain fault states, as can a downward deviation. Furthermore, the degree of the deviation can also be an indication for certain fault states.

A preferred development is distinguished by the fact that the deriving of a fault state includes the identification of a defective underloading of the motorized roller if the determined current of the motorized roller undershoots the reference value for the reference operating state, in particular, by a predetermined value.

It is also preferred that the deriving of a fault state includes the identification of a defective overloading of the motorized roller if the determined current of the motorized roller exceeds the reference value for the reference operating state, in particular, by a predetermined value.

In a further preferred embodiment, the method comprises receiving a signal from an operating state sensor of the conveyor system and using the signal to qualify the determined current, for example, to derive information on the operating state, in particular, for checking whether the reference operating state is present.

The signal preferably comprises data from the operating state sensor or is a data signal. A preferred development is distinguished by the fact that the operating state sensor is designed as a light barrier sensor or comprises a light barrier sensor. The operating state sensor can preferably be designed to detect if a conveyable item enters and/or exits a conveyor zone, in particular a certain portion of a conveyor zone.

It is also preferred that the method comprises determining a temperature, for example, by means of a temperature sensor, and using the determined temperature to qualify the determined current, for example, for deriving information on the operating state, in particular, for checking whether the reference operating state is present.

What is to be understood by temperature in this description is both an internal temperature of the motorized roller and an ambient temperature of the motorized roller and/or of the conveyor zone and/or of the conveyor system, for example, room temperature.

It is particularly preferred that the method comprises determining an ambient temperature, for example, by means of an ambient temperature sensor, and using the determined ambient temperature to qualify the determined current, for example, for deriving information on the operating state, in particular, for checking whether the reference operating state is present.

It is also preferred that the method comprises determining an internal temperature of the motorized roller, for example, by means of an internal temperature sensor, and using the determined internal temperature of the motorized roller to qualify the determined current, for example, for deriving information on the operating state, in particular, for checking whether the reference operating state is present.

Taking the internal temperature of the motorized roller into consideration has the advantage that overheating states can be identified. Taking the ambient temperature of the motorized roller into consideration has the advantage that influencing factors outside the motorized roller acting on the internal temperature of the motorized roller can be taken into consideration (such as, for example, heating of the space due to strong solar radiation) and in this way the internal temperature of the motorized roller can be assessed differently and/or correlated with the room temperature, in particular, for a further use.

According to a preferred embodiment, the method comprises detecting operating hours of the motorized roller and using the detected operating hours to qualify the determined current, for example, for deriving information on the operating state, in particular, for checking whether the reference operating state is present. It is possible to ensure in this way that a motorized roller has been "run in" before the reference operating state is identified, and/or the reference operating state is produced in regular intervals.

It is also preferred that the method comprises identifying the presence of the reference operating state if at least two, preferably three or all, of the following conditions are present:
  the signal of the operating state sensor indicates a predetermined situation of the motorized roller, for example, an idling situation or an acceleration situation,
  the determined temperature lies in a predetermined range, in particular the internal temperature of the motorized roller and/or the ambient temperature of the motorized roller and/or of the conveyor zone and/or of the conveyor system,
  the detected operating hours lie in a predetermined range.

If two or more or all of these conditions are met, a state monitoring on the basis of the determined current can occur in a particularly simple and reliable manner.

In a preferred embodiment, a conveyor zone is provided which comprises the motorized roller and also one, two or more or all of the following elements:
  a conveyor roller, in particular, a nondriven conveyor roller, such as a slave roller,
  a transmission element, for example, a belt, for transmitting the drive force from the motorized roller to the conveyor roller,
  a bearing for rotatably mounting the motorized roller and/or the conveyor roller.

The conveyor zone preferably comprises two, three, or more conveyor rollers, in particular, nondriven conveyor rollers, and/or two, three, or more transmission elements, and/or two, three, or more bearings. Furthermore, the conveyor zone preferably comprises a gear mechanism which is preferably comprised by the motorized roller.

A further preferred development is distinguished by the fact that two or more conveyor rollers are provided and/or two or more motorized rollers are provided which are controlled by a, preferably common, control unit.

It is also preferred that one, two, or more or all of the steps disclosed herein are carried out separately for each motorized roller and/or for each conveyor roller and/or for each further element of a conveyor zone.

Furthermore, there is preferably provision that one, two, or more or all of the steps disclosed herein are carried out for two or more motorized rollers and/or for two or more conveyor rollers and/or for two or more further elements of a conveyor zone by a common control unit.

The control unit is preferably designed to control two or more conveyor rollers and/or two or more motorized rollers and/or to carry out one, two or more or all of the steps disclosed herein separately for each motorized roller and/or for each conveyor roller and/or for each further element of a conveyor zone and/or to jointly carry out one, two, or more or all of the steps disclosed herein for two or more motorized rollers and/or for two or more conveyor rollers and/or for two or more further elements of a conveyor zone.

It is also preferred that the method comprises comparing the determined current of two or more motorized rollers of a conveyor zone. It is also preferred that the determined current of a further motorized roller of the same conveyor zone is used as reference value for the comparison. It is possible in this way for relative differences in the states of conveyor rollers, in particular, motorized rollers, of a conveyor zone to be identified in a particularly simple manner.

A variable derived from a plurality of variables, such as, for example, an average value, can also be used as reference value for the comparison. For this purpose, it is also possible, where appropriate, to take into consideration values of conveyor rollers from another conveyor zone, in particular, of conveyor rollers at a comparable position of another conveyor zone. It is possible in this way for relative differences between the conveyor rollers, in particular, motorized rollers, used in different conveyor zones at similar positions to be identified in a particularly simple manner.

In a further preferred embodiment, the method comprises determining the reference value for the reference operating state. A preferred development is distinguished by the fact that the determination of the reference value for the reference operating state comprises determining the current of the motorized roller if at least two, preferably three, or all of the following conditions are present:
  the control unit requests a reference value determination,
  the control unit and/or the motorized roller have/has been exchanged and/or modified,
  an element of the conveyor zone has been exchanged and/or modified,
  two or more elements of the conveyor zone have been exchanged and/or modified,
  after putting into operation the motorized roller and/or the control unit and/or an element of the conveyor zone and/or of two or more elements of the conveyor zone, wherein "after putting into operation" comprises, in particular, a predetermined time period after putting into operation,
  a certain temperature has already been achieved at least once or exceeded,
  a certain internal temperature of the motorized roller has already been achieved at least once or exceeded,
  a certain ambient temperature of the motorized roller and/or of the conveyor zone and/or of the conveyor system, for example, room temperature, has already been achieved at least once or exceeded,
  the motorized roller has achieved or exceeded a minimum number of revolutions and/or of operating hours,
  a certain temperature, in particular, a certain internal temperature of the motorized roller and/or a certain ambient temperature of the motorized roller and/or of the conveyor zone and/or of the conveyor system, is present,
  a certain temperature range, in particular, a certain internal temperature range of the motorized roller and/or a certain ambient temperature range of the motorized roller and/or of the conveyor zone and/or of the conveyor system, is present,
  a certain temperature, in particular, a certain internal temperature of the motorized roller and/or a certain ambient temperature of the motorized roller and/or of the conveyor zone and/or of the conveyor system, is known,
  a certain temperature range, in particular, a certain internal temperature range of the motorized roller and/or a certain ambient temperature range of the motorized roller and/or of the conveyor zone and/or of the conveyor system, is known,
  a temperature factor for a certain temperature, in particular, a certain internal temperature of the motorized roller and/or a certain ambient temperature of the motorized roller and/or of the conveyor zone and/or of the conveyor system, is present and is taken into consideration in the determination of the reference value,
  a temperature factor for a certain temperature range, in particular, a certain internal temperature range of the motorized roller and/or a certain ambient temperature range of the motorized roller and/or of the conveyor zone and/or of the conveyor system, is present and is taken into consideration in the determination of the reference value.

A temperature factor can be, for example, a correction factor which is provided for a certain temperature range in order to improve the determination of the reference value for this temperature range.

According to a preferred embodiment, there is provision that the determination of the reference value for the reference operating state is implemented repeatedly and preferably a plurality of results of the repeated implementations are taken into consideration, for example, over average values and/or a range of values.

It is also preferred that the method comprises activating the motorized roller and/or the conveyor zone and/or the conveyor system in such a way that the reference operating state is achieved. In this way, the reference operating state can be produced in a targeted manner, for example, if it has not existed over a predetermined time period.

In a further preferred embodiment, the method comprises the activation of the motorized roller and/or of the conveyor zone and/or of the conveyor system in such a way that the reference operating state is achieved if at least one, two, or all of the following conditions are present:
  the determined temperature, the determined internal temperature of the motorized roller and/or the determined ambient temperature of the motorized roller and/or of the conveyor zone and/or of the conveyor system, lies in a predetermined range,
  the detected operating hours lie in a predetermined range.

A preferred development is distinguished by the fact that the activation of the motorized roller and/or of the conveyor zone and/or of the conveyor system occurs in such a way that the reference operating state is achieved, and comprises the generation of a control signal with which the motorized roller is brought into a predetermined situation, for example an idling situation or an acceleration situation.

A preferred development is distinguished by the fact that the method comprises generating a control signal, in particular, for the motorized roller, on the basis of the comparison of the determined current of the motorized roller with the reference value for the reference operating state.

It is also preferred that the control signal provides a change in the power of the motorized roller in dependence on a deviation of the determined current of the motorized roller from the reference value for the reference operating state. In a preferred embodiment, there is provision that the control signal provides a reduction in the power of the motorized roller if the determined current of the motorized roller exceeds the reference value for the reference operating state. In a further preferred embodiment, there is provision that the control signal provides an increase in the power of the motorized roller if the determined current of the motorized roller undershoots the reference value for the reference operating state.

According to a further aspect of the invention, the object stated at the outset is achieved by a control unit for a motorized roller and/or a conveyor zone of a conveyor system and/or a conveyor section of a conveyor system, wherein the control unit is designed to carry out the above-described method for state monitoring.

According to a further aspect of the invention, the object stated at the outset is achieved by a motorized roller having an above-described control unit.

According to a further aspect of the invention, the object stated at the outset is achieved by a motorized roller for a conveyor system, wherein the motorized roller is designed to carry out the above-described method for state monitoring.

According to a further aspect of the invention, the object stated at the outset is achieved by a conveyor zone having an above-described motorized roller and/or having an above-described control unit.

According to a further aspect of the invention, the object stated at the outset is achieved by a conveyor zone for a conveyor system, wherein the conveyor zone is designed to carry out the above-described method for state monitoring.

According to a further aspect of the invention, the object stated at the outset is achieved by a conveyor section having an above-described motorized roller and/or having an above-described control unit.

According to a further aspect of the invention, the object stated at the outset is achieved by a conveyor section for a conveyor system, wherein the conveyor section is designed to carry out the above-described method for state monitoring.

According to a further aspect of the invention, the object stated at the outset is achieved by a conveyor system having an above-described conveyor zone and/or having an above-described conveyor section and/or having an above-described motorized roller and/or having an above-described control unit.

According to a further aspect of the invention, the object stated at the outset is achieved by a conveyor system having a motorized roller and a control unit, wherein the conveyor system is designed to carry out the above-described method for state monitoring.

The aspects according to the invention and possible developments thereof have features which make them particularly suitable to be used in an above-described method and respective developments thereof. With regard to the advantages, embodiment variants, and embodiment details of these further aspects of the invention and possible developments thereof, reference is made to the foregoing description pertaining to the corresponding method features.

BRIEF DESCRIPTION OF THE DRAWINGS

A preferred embodiment of the invention is described by way of example on the basis of the appended figures, in which.

DETAILED DESCRIPTION OF THE EMBODIMENTS

Figure 1:
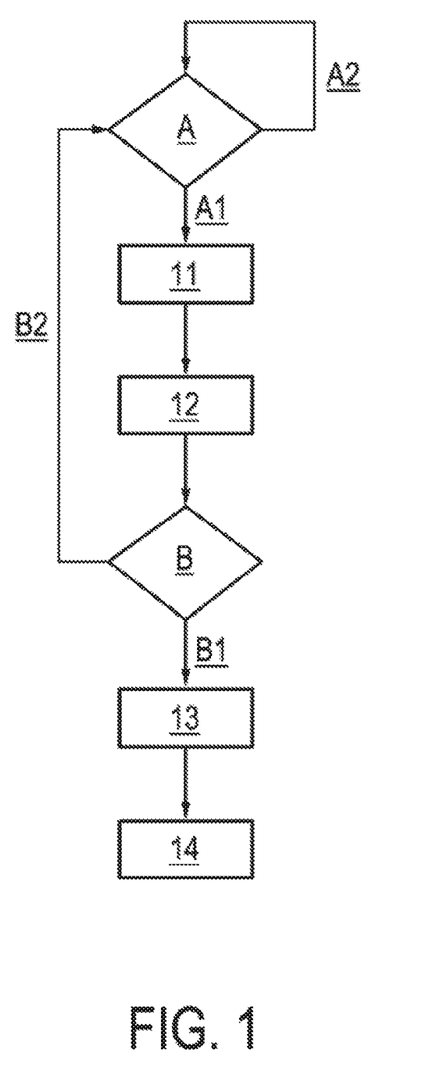
FIG. 1 shows a schematic illustration of one embodiment of the method for state monitoring.

FIG. 1 shows a schematic illustration of one embodiment of the method for state monitoring. The method begins in step A with the checking for the presence of a reference operating state. If the checking does not reveal a reference operating state, renewed checking of the presence of a reference operating state is carried out, as denoted by arrow A2, preferably after the expiry of a predetermined time and/or at regular intervals and/or before or after a certain event and/or in response to a user request.

If a reference operating state is present (arrow A1), the current of a motorized roller is determined in the next step 11. Subsequently, in step 12, the determined current of the motorized roller is compared with a reference value for the reference operating state. In step B, it is then checked whether the determined current of the motorized roller deviates from the reference value for the reference operating state. If this is not the case (arrow B2), no fault message is output, but the method is started afresh, preferably after the expiry of a predetermined time and/or at regular intervals and/or before or after a certain event and/or in response to a user request.

If the determined current of the motorized roller deviates from the reference value for the reference operating state in step B, a fault state on the basis of the comparison can then be derived in step 13. Moreover, in step 14, a control signal, in particular, for the activation of the motorized roller, can then be generated on the basis of the comparison.

Figure 2:
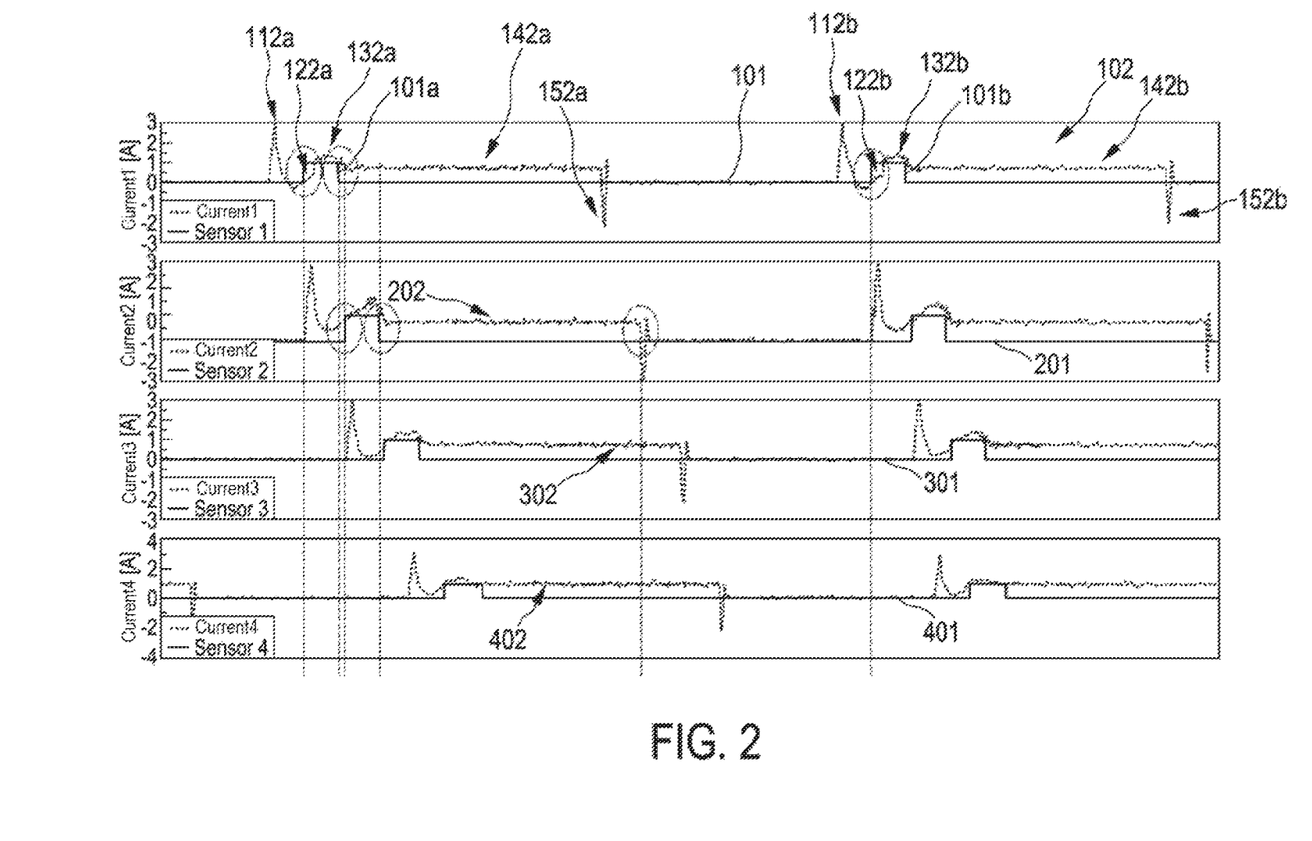
FIG. 2 shows the determined current of four motorized rollers.

FIG. 2 shows the determined current of four motorized rollers (current 1, current 2, current 3, current 4) and also the associated signals of four operating state sensors (sensor 1, sensor 2, sensor 3, sensor 4) over time.

The profile of the four signals of the four operating state sensors is represented by the lines 101, 201, 301, 401. The signal profile of the first operating state sensor has a first maximum 101a and a second maximum 101b. These maxima 101a, 101b indicate that a conveyable item reaches the first motorized roller or the associated first conveyor zone. Corresponding, but time-staggered maxima, are also evident in the signal profiles 102, 202, 302, 402 of the further operating state sensors.

Before the maxima 101a, 101b, the determined current of the first motorized roller also shows the maxima 112a, 112b. After descending to local minima, the determined current of the first motorized roller then shows ascending phases 112a, 112b to local maxima 132a, 132b and also subsequent idling situations 142a, 142b, with minima 152a, 152b. Corresponding, but time-staggered profiles are also evident in the profiles 202, 302, 402 of the determined currents of the further motorized rollers.

Figure 3:
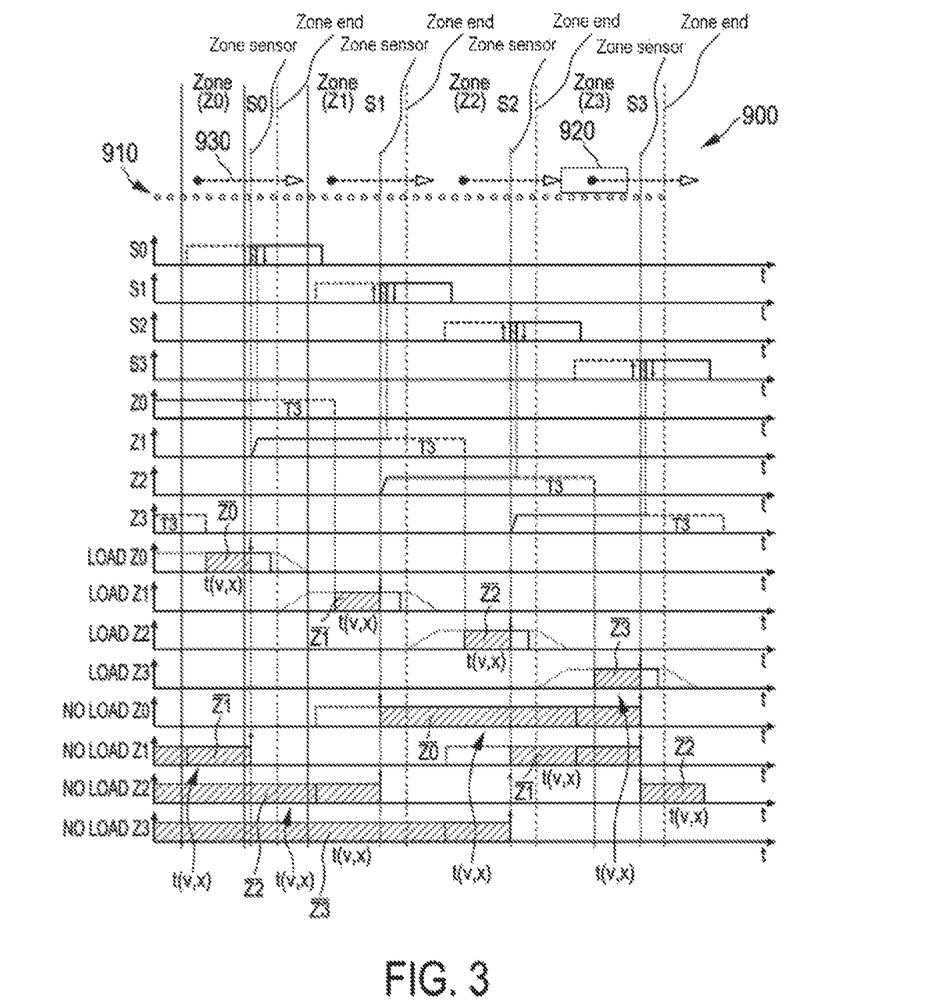
FIG. 3 shows a comparison of four motorized rollers in different operating states.

FIG. 3 shows a comparison of four motorized rollers in different operating states. In the upper part of FIG. 3, a conveyor system 900 is schematically illustrated first of all. The conveyor system 900 has a plurality of conveyor rollers 910 (both motorized rollers and nondriven conveyor rollers) in four conveyor zones Z0, Z1, Z2, Z3. Each conveyor zone Z0, Z1, Z2, Z3 has a respective operating state sensor and motorized roller. There is also schematically illustrated a conveyable item 920 which is moved in conveying direction 930 from conveyor zone to conveyor zone.

In the lower part of FIG. 3, the states of the four operating state sensors S0, S1, S2, S3 and the states of the four motorized rollers in the four conveyor zones are schematically illustrated over time. Represented by Z0, Z1, Z2, Z3 is first of all the general activity of a conveyor zone. The loading state by a conveyable item is then represented by LOAD Z0, LOAD Z1, LOAD Z2, LOAD Z3, and the state without loading is represented by NO LOAD Z0, NO LOAD Z1, NO LOAD Z2, NO LOAD Z3.

Figure 4:
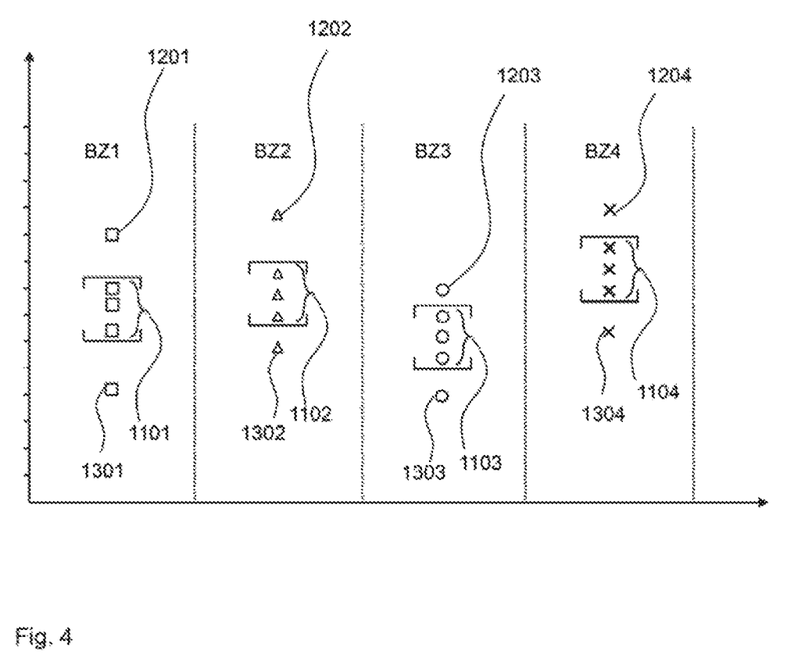
FIG. 4 shows a comparison of the determined current of a motorized roller with a respective reference value in four operating states.

FIG. 4 shows a comparison of the determined current of a motorized roller with a respective reference value in four operating states BZ1, BZ2, BZ3, BZ4. Operating state BZ1 corresponds to loading, operating state BZ2 corresponds to transport, operating state BZ3 corresponds to unloading, and operating state BZ4 corresponds to the idling situation.

Reference values for the current in the respective operating states BZ1, BZ2, BZ3, BZ4 for a conveyable item are represented by 1101, 1102, 1103, 1104.

Also represented in FIG. 4 are the values for the determined current for a conveyable item, specifically by 1201, 1202, 1203, 1204 in the respective operating states BZ1, BZ2, BZ3, BZ4.

As is evident, the values 1201, 1202, 1203, 1204 for the determined current lie above the reference values. This can be an indication of a fault or disturbance case which results in the overcoming of a relatively high mass inertia. This can be caused, for example, by a disturbing body or the defect of a drive component. A drive component can be any component which causes a movement; for example, a drive component can be a motorized roller, a slave roller, a drive belt, a drive element or a drive unit.

Also represented in FIG. 4 are the values for the determined current for a conveyable item, specifically by 1301, 1302, 1303, 1304 in the respective operating states BZ1, BZ2, BZ3, BZ4.

As is evident, the values 1301, 1302, 1303, 1304 for the determined current lie below the reference values. This can be an indication of a fault or disturbance case which, for example, decouples a passive drive component, such as an interrupted power transmission/drive belt.

The invention claimed is:

1. A method for state monitoring in a conveyor system having a plurality of motorized rollers and a control unit, the method comprising the steps of:
   checking for the presence of a reference operating state;
   determining a current of one of the plurality of motorized rollers if the reference operating state is present; and
   comparing the determined current of the one of the plurality of motorized rollers with a reference value for the reference operating state; and
   Comparing the determined current of two or more of the plurality of motorized rollers;
   wherein the determined current of a further motorized roller is used as the reference value for the comparison.

2. The method as claimed in claim 1, further comprising the step of checking whether the determined current of the two or more of the plurality of motorized rollers deviates from the reference value for the reference operating state.

3. The method as claimed in claim 1, further comprising the step of deriving a fault state on the basis of the comparison of the determined current of the two or more of the plurality of motorized rollers with the reference value for the reference operating state or the basis of the comparison with the determined current of the further motorized rollers as the reference value for the reference operating state.

4. The method as claimed in claim 1, further comprising the step of:
   receiving a signal from an operating state sensor of the conveyor system and using the signal to qualify the determined current;
   determining a temperature and using the determined temperature to qualify the determined current; or
   detecting operating hours of the one of the plurality of motorized rollers and using the detected operating hours to qualify the determined current.

5. The method as claimed in claim 4, further comprising the step of identifying the presence of the reference operating state if at least two of the following conditions are present:
   the signal of the operating state sensor indicates a predetermined situation of the one of the plurality of motorized rollers, including an idling situation or an acceleration situation;
   the determined temperature lies in a predetermined range; and/or
   the detected operating hours lie in a predetermined range.

6. The method as claimed in claim 1, wherein a conveyor zone is provided which comprises the motorized roller and one of the following elements:
   a conveyor roller;
   a transmission element for transmitting the drive force from the one of the plurality of motorized rollers to the conveyor roller; or
   a bearing for rotatably mounting the one of the plurality of motorized rollers or the conveyor roller.

7. The method as claimed in claim 6, wherein a plurality of conveyor rollers are provided and/or the plurality of motorized rollers are controlled by the control unit.

8. The method as claimed in claim 6, wherein one of the steps is carried out separately for the one of the plurality of motorized rollers, the conveyor roller, or the element of the conveyor zone.

9. The method as claimed in claim 6, wherein one of the steps is carried out for the ono f motorized rollers, the conveyor roller, or the element of the conveyor zone by a common control unit.

10. The method as claimed in claim 1, wherein the conveyor system further comprises the plurality of motorized rollers within a conveyor zone.

11. The method as claimed in claim 10, wherein the determined current of a further motorized roller of the conveyor zone is used as reference value for the comparison.

12. The method as claimed in claim 6, further comprising the step of determining the reference value for the reference operating state, wherein the determination of the reference value for the reference operating state comprises determining the current of the one of the plurality of motorized rollers if at least two of the following conditions are present:
   the control unit requests a reference value determination;
   the control unit or the one of h motorized rollers have been exchanged or modified;
   an element of the conveyor zone has been exchanged or modified; and
   after putting into operation the of motorized rollers; the control unit, or an element of the conveyor zone;
   a predetermined temperature has already been achieved at least once, undershot, or exceeded;
   the one of the plurality of motorized rollers has achieved or exceeded a minimum number of revolutions or of operating hours;

a predetermined temperature is present;
a predetermined temperature is known; or
a temperature factor for a predetermined temperature is present and is taken into consideration in the determination of the reference value.

13. The method as claimed in claim 1, further comprising step of activating the one of the plurality of motorized rollers, a conveyor zone, or the conveyor system such that the reference operating state is achieved.

14. The method as claimed in claim 13, wherein the step of activation of the one of the plurality of motorized rollers, the conveyor zone, or the conveyor system occurs such that the reference operating state is achieved if at least one of the following conditions is present:
the determined temperature lies in a predetermined range; or
the detected operating hours lie in a predetermined range.

15. The method as claimed in claim 13, wherein the step of activation of the one of the plurality of motorized rollers, the conveyor zone, or the conveyor system occurs such that the reference operating state is achieved, and the method further comprises the step of generating a control signal with which the one of the plurality of motorized rollers is brought into a predetermined situation, including an idling situation or an acceleration situation.

16. The method as claimed in claim 1, further comprising the step of generating a control signal on the basis of the comparison of the determined current of the one of the plurality of motorized rollers with the reference value for the reference operating state.

17. The method as claimed in claim 16, wherein the control signal provides a change in the power of the one of the plurality of motorized rollers in dependence on a deviation of the determined current of the one of the plurality of motorized rollers from the reference value for the reference operating state.

18. A control unit for a motorized roller or a conveyor zone of a conveyor system, wherein the control unit is adapted to carry out a method for state monitoring comprising the steps of:
checking for the presence of a reference operating state;
determining a current of the one of the plurality of motorized rollers if the reference operating state is present; and
comparing the determined current of the one of the plurality of motorized rollers with a reference value for the reference operating state;
comparing the determined current of two or more of the plurality of motorized rollers;
wherein the determined current of a further motorized roller is used as the reference value for the comparison.

19. A motorized rollers for a conveyor system having a control unit, wherein the control unit is adapted to carry out a method for state monitoring comprising the steps of:
checking for the presence of a reference operating state;
determining a current of one of the plurality of motorized rollers if the reference operating state is present; and
comparing the determined current of the one of the motorized rollers with a reference value for the reference operating state;
comparing the determined current of two or more of the plurality of motorized rollers;
wherein the determined current of a further motorized roller is used as the reference value for the comparison.

20. A conveyor system having a plurality of motorized rollers and a control unit, wherein the control unit of the conveyor system is adapted to carry out a method for state monitoring comprising the steps of:
checking for the presence of a reference operating state;
determining a current of one of the plurality of motorized rollers if the reference operating state is present; and
comparing the determined current of the one of the plurality of motorized rollers with a reference value for the reference operating state;
comparing the determined current of two or more of the plurality of motorized rollers;
wherein the determined current of a further motorized roller is used as the reference value for the comparison.

* * * * *

UNITED STATES PATENT AND TRADEMARK OFFICE
CERTIFICATE OF CORRECTION

PATENT NO. : 11,420,825 B2
APPLICATION NO. : 16/770770
DATED : August 23, 2022
INVENTOR(S) : Hampe et al.

It is certified that error appears in the above-identified patent and that said Letters Patent is hereby corrected as shown below:

In the Claims

Column 12, Claim 9, Line 41, "ono f" should be --one of--.

Column 12, Claim 12, Line 57, "h" should be --the plurality of--.

Column 12, Claim 12, Line 61, "the of motorized rollers;" should be --the one of the plurality of motorized rollers,--.

Column 13, Claim 18, Line 36, "a motorized roller" should be --a plurality of motorized rollers--.

Column 14, Claim 18, Line 2, "of the one" should be --of a one--.

Column 14, Claim 19, Line 12, "A motorized" should be --A plurality of motorized--.

Signed and Sealed this
First Day of August, 2023

Katherine Kelly Vidal
*Director of the United States Patent and Trademark Office*